Patented Apr. 15, 1924.

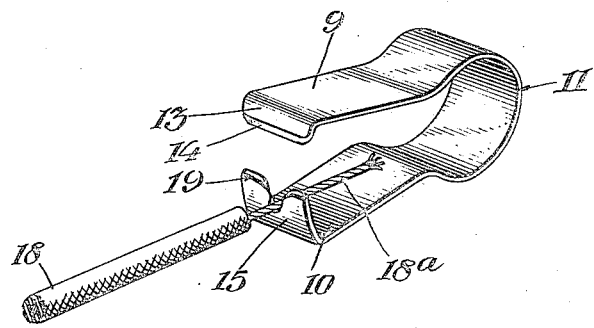
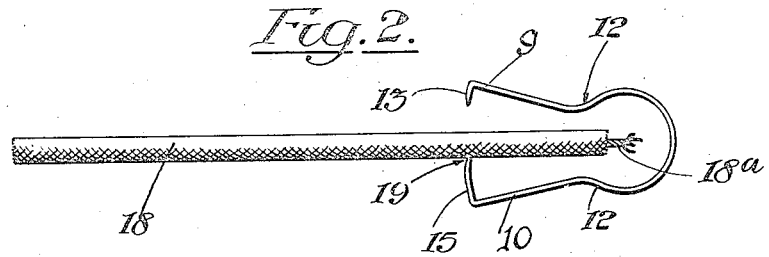
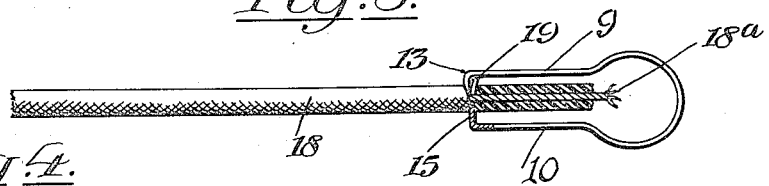
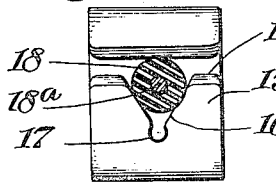
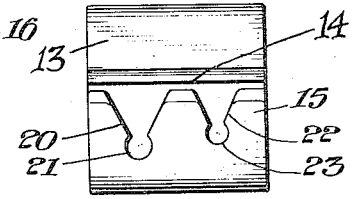
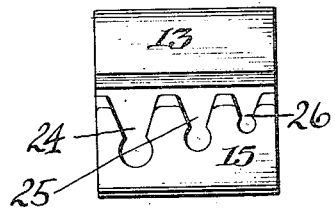
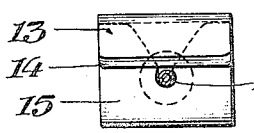

1,490,459

UNITED STATES PATENT OFFICE.

ALAN R. FERGUSSON, OF BUFFALO, NEW YORK.

WIRE STRIPPER.

Application filed January 3, 1923. Serial No. 610,420.

*To all whom it may concern:*

Be it known that I, ALAN R. FERGUSSON, a citizen of the United States, residing at Buffalo, in the county of Erie and State of New York, have invented certain new and useful Improvements in Wire Strippers, of which the following is a specification.

This invention relates to wire strippers and particularly to a device for cutting and stripping off insulation from wire, an object of the invention being to provide an improved device of this class which will cut and strip the insulation from the wire without cutting the wire and which also will be relatively cheap to manufacture, efficient in use and easy to manipulate.

A further object of this invention is to provide an improved wire stripping device comprising a pair of spring connected jaws provided with means for limiting the movement of the jaws to a predetermined cutting depth so that in operation the jaws will cut only through the insulation, preparatory to stripping the insulation from the wire, and without cutting the wire.

A further object of this invention is to provide a wire stripper which is so constructed as to facilitate the stripping of the insulation from the wire and wherein the cutting portion of the device is so formed as to be readily sharpened or honed.

Other objects of this invention will appear in the following description thereof reference being had to the accompanying drawings forming part of this specification wherein like reference characters indicate corresponding parts in the several views and wherein Fig. 1 is a perspective view of my improved wire stripping device; Fig. 2 is a side view thereof with the wire in position to be stripped; Fig. 3 is a side view illustrating the device after the wire insulation has been cut; Fig. 4 is a front end view illustrating the stripping members before cutting the wire insulation;

Fig. 5 is a front end view illustrating the jaws in position after the wire has been cut and Figs. 6, 7 and 8 are front end views illustrating modified forms.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology, which I employ is for the purpose of description and not of limitation.

My improved wire stripping device comprises in its present preferred form a pair of jaws or arms 9 and 10 connected together by a spring bow 11. As herein illustrated the device may be bent up or formed from a single piece or strip of metal. It will be noted that the spring bow 11 is bent outwardly at 12 from the plane of the arms 9 and 10 so as to form shoulder portions or abutments for gripping the device.

These shoulder portions furnish stops for preventing the fingers from slipping off the device when stripping the insulation from the wire. The shoulders thus provide a good grip for the fingers so that there is no danger, when a sudden tug or pull is given for the purpose of stripping the insulation, of the fingers slipping and being cut by the edges of the metal arms.

The arm or jaw 9 is bent inwardly at its outer end to provide a stripper 13 having a substantially straight or continuous cutting edge 14. The opposed jaw or arm 10 is also bent inwardly to provide a stripper 15. The stripper 15 is cut away to form a tapered notch 16 terminating in a curved recess or cup 17. The side edges of the notch 16 as well as the curved recess or cup 17 are preferably unsharpened or blunt, only the straight cutting edge 14 of the stripper 13 being sharpened, and as a result it will be seen that this knife edge being straight or continuous may be honed with facility.

In use the covered or insulated wire 18 is placed in the beveled or tapered groove or notch 16 as shown in Fig. 4, and the device is grasped by placing the fingers against the abutments or shoulder portions 12. By twisting the stripper the knife edge 14 cuts into the insulation of the wire and at the same time forces the covered wire into the circular or curved recess 17 at the bottom of the beveled groove or notch 16. (This recess or cup 17 is smaller in diameter than the entire insulated wire but is slightly larger in diameter than the collective wire strands $18^a$. Therefore, after the knife edge 14 has cut through the insulation around the wire strands and forced the same into the circular cup 17 the blunt walls of the cup or recess and the lower part of the V-shaped notch become embedded in the insulation, as shown in Figs. 3 and 5. After thus cutting the insulation and embedding the edges of the cup or recess 17 in the insulation, a sharp tug or pull will strip the cut insulation from the wire strands and leave the latter intact. It will thus be seen that the circular recess together with the lower part of the V-shaped notch and the knife 14 which presses the cut insulated wire into the recess 17 performs the function of stripping the insulation.

It will be especially noted that the stripping member 15 is longer than the stripping member 13 and hence when the jaws are pressed together so as to cause the stripper 13 to overlap the stripper 15, also causing the knife edge 14 to cooperate with the notch 16, the upper edge 19 will engage the under face of the arm 9, thus limiting the relative movement of the jaws and prevent the cutting edge 14 from cutting the wire strands. Thus, the stripping member 15 forms a combined stripper and stop, since the ends thereof, when the jaws are pressed together engage the opposite jaw thereby limiting the throw or travel of the cutting edge 14 so as to prevent the same from touching the wire.

Since the gage of insulated wire varies, the diameter of the upper strands vary accordingly, and hence where it is desired to provide a device which will be effective for use with wire of different gages, the stripping member 15 may be provided with notches and recesses of different sizes to correspond with different gages of wire. In Fig. 6 I have illustrated a construction wherein two notches are provided, the notch 20 with its circular recess 21 being adapted for a somewhat larger gage of wire than the notch 22 with its circular recess 23. Likewise in Fig. 7 the stripping member 15 is provided with three sets of notches and recesses 24, 25, and 26 which permit the device in this instance to be used for any of three different gages of wire. Furthermore, by having a plurality of sets of notches and recesses as illustrated in Figs. 6 and 7 it is possible to utilize the device for stripping insulation from a given sized wire without cutting the wire strands and also for scraping the wire strands after stripping the insulation therefrom. Where, therefore the device is provided, as shown in Fig. 6, with two sets of grooves and recesses, the larger groove 20 with its recess 21 is adapted to strip the insulation from a wire of certain gage, whereupon the smaller groove 22 with its recess 23 is adapted to fit tightly over the wire strands and scrape the same.

Thus, each groove with its recess or cup, where several sets are used, will serve two purposes, namely to strip off the insulation of one size wire and scrape the copper strands on a larger size wire. In this way it is not necessary for the electrician to scrape the wire strands with his knife after removing the insulation.

In the form illustrated in Fig. 8, the inwardly extending stripping member 15 may, if desired be provided merely with a V-shaped groove 27 of suitable size to adapt the same for any particular size of wire. In this case the side edges of the notch or groove 27 are blunt or unsharpened and in like manner as hereinbefore described the knife edge 14 of the stripping member 13 will cooperate therewith for the purpose of removing the insulation.

It will also be noted that the circular spring back 11 of the jaws 9 and 10, wherein the spring curves outwardly from the plane of the jaws, not only increases the tension of the spring but also provides a firm hold for the fingers when pulling off the insulation. And since the only part of the stripper which is sharpened is the cutting edge 14 the device may be readily and easily sharpened.

As shown particularly in Figs. 2 and 3, the upper edge 19 of the stripping member 15 is bent inwardly out of alinement with the cutting edge 14 so that when the jaws 9 and 10 are pressed together the knife edge 14 will overlap the stripping member 15.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A wire stripping device comprising a pair of connected arms having each a projecting wire engaging member, one of said members having a notch and the other a substantially straight cutting edge adapted to overlap a face of the notched member, and means for limiting the extent of overlapping of said jaws so that the cutting edge will overlap a part only of said notch.

2. A wire stripping device comprising a pair of connected arms having each a projecting wire engaging member, one of said members having a plurality of notches of different sizes and the other a substantially straight cutting edge adapted to overlap a face of said notched member, and means for limiting the extent of overlapping of said jaws so that the cutting edge will overlap simultaneously a part only of each notch.

3. A wire stripping device comprising a pair of members having inwardly extending stripping jaws, one of said jaws having a straight cutting edge, and the other jaw being longer than said first jaw so as to abut against one of the members in rear of said first jaw when the jaws are forced together.

4. A wire stripping device comprising a pair of members having inwardly extending stripping jaws, one of said jaws having a straight cutting edge overlapping the outer face of the other jaw, the latter being longer than said first jaw so as to abut against one of the members in rear of the first jaw when the jaws are forced together.

5. In a wire stripping device a pair of connected jaws having inwardly extending cooperating strippers, one thereof longer than the other so as to abut against a part of the other jaw when the jaws are forced together.

6. In a wire stripping device a pair of spring jaws having inwardly extending strippers, one having a blunt edged notch and the other a substantially straight cutting edge adapted to overlap the same, and means for limiting the extent of overlapping thereof so that the cutting edge will overlap a part only of said notch.

7. In a wire stripping device a pair of jaws having inwardly extending strippers, one of the strippers having a cutting edge and the other having a notch and being longer than the first stripper so as to cause said cutting edge to overlap only a part of said notch when the jaws are shifted into overlapping relation.

8. A wire stripper comprising a pair of members having projecting stripping jaws, one of said jaws having a tapering notch forming an opening at the outer end of the jaw to embrace an insulating wire, the sides of the notch converging and terminating in a circular recess, the other jaw having a substantially straight cutting edge adapted to overlap said tapering notch, and means for limiting the extent of overlapping of said last jaw to substantially the juncture of said notch and recess.

9. A wire stripper comprising a pair of members having projecting stripping jaws, one thereof adapted to overlap the other when the jaws are forced together, one of said jaws having a notch and the other a cutting edge, and means for limiting the overlapping of said jaws so that the cutting edge will overlap a part only of said notch.

10. A wire stripper comprising a pair of connected jaws including inwardly extending stripping members, one of said members overlapping the other when the jaws are shifted together, and one of said members engaging a part of the other jaw to effect a predetermined adjustment of said stripping members.

11. A wire stripper comprising a pair of connected members movable toward each other in overlapping relation for cutting wire insulation, one thereof having a notch and the other a substantially straight cutting edge, and means for limiting the movement of said members so that the cutting edge will overlap a part only of said notch.

12. A wire stripping device comprising a pair of spring connected jaws, said jaws having a pair of inwardly extending projecting members, one thereof constructed to form a combined wire stripper and stop for limiting the relative movement of said jaws.

13. A wire stripper comprising a pair of members movable toward each other for cutting wire insulation, one of said members having a tapered notch terminating in a circular recess, and the other a part adapted to overlap the notch and force the wire into the circular recess, said notch and part having one a cutting edge, and means for limiting said cutting edge against overlapping said circular recess.

Signed at Buffalo, Erie Co., New York, this 30th day of December, 1922.

ALAN R. FERGUSSON.